United States Patent Office 2,707,396
Patented May 3, 1955

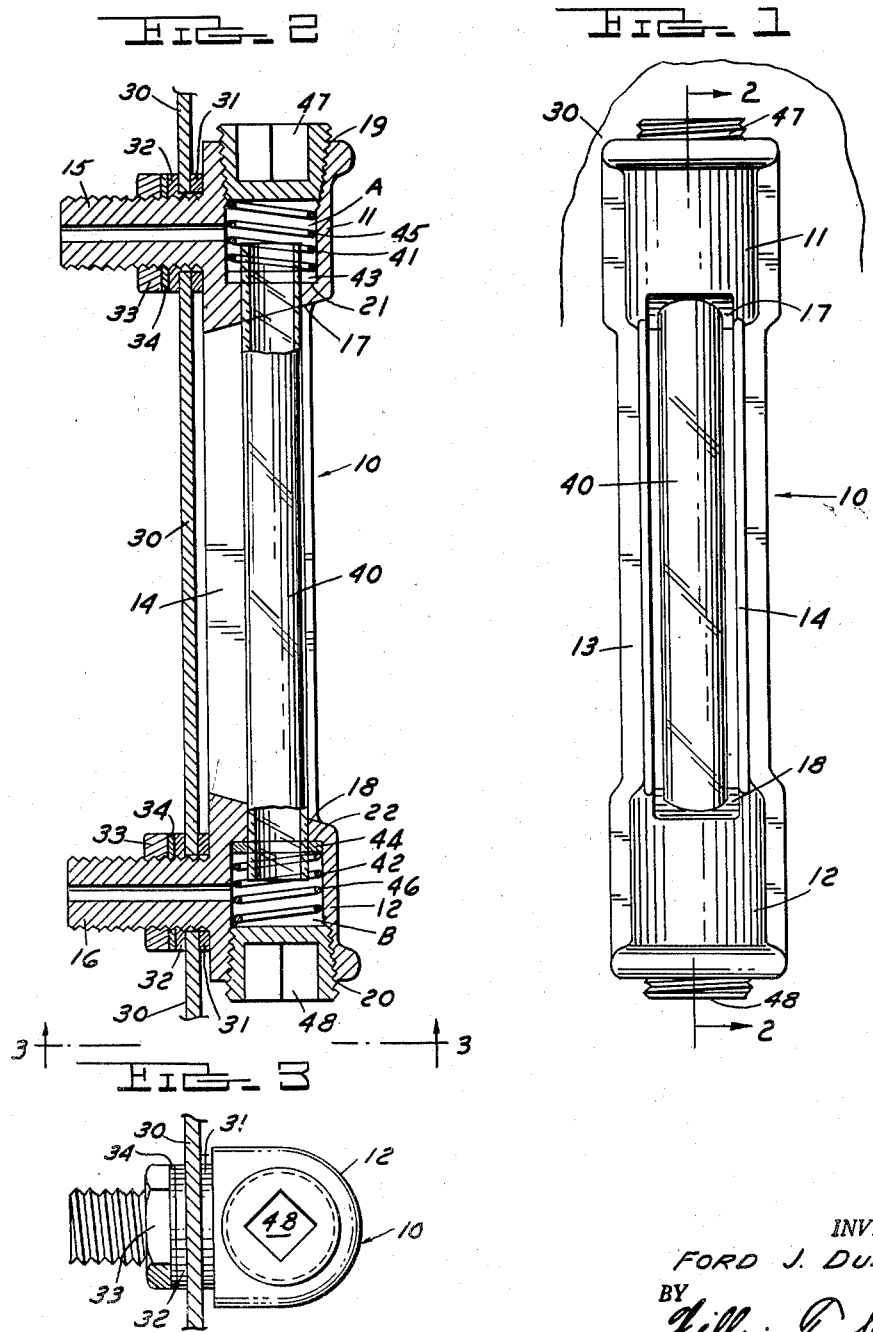

2,707,396

LIQUID LEVEL SIGHT GAUGE

Ford J. Dupure, Dearborn, Mich.

Application May 16, 1952, Serial No. 288,281

4 Claims. (Cl. 73—326)

This invention relates to a liquid level sight gauge for use in determining the liquid level of tanks, boilers, and other liquid containing devices.

Liquid level sight gauges have been employed heretofore to facilitate determining the liquid level of the container, however, the several devices of the prior art have not proven entirely satisfactory inasmuch as they are complicated in design and construction, expensive to manufacture, and difficult to install.

With the foregoing in view, the primary object of the invention is to provide a liquid level sight gauge which is simple in design and construction, inexpensive to manufacture, and easy to install.

An object of the invention is to provide an integral body sight gauge which can be manufactured cheaper than sight gauges assembled from various parts as the separate manufacturer of the parts and the subsequent integration thereof is eliminated.

An object of the invention is to provide a sight gauge which is mountable as a unit thereby insuring proper alignment between the heads and the sight glass apertures.

An object of the invention is to provide a sight gauge having a glass sealably mounted between resilient members and out of contact with positive force members thereby eliminating breaking of the glass.

An object of the invention is to provide a sight gauge having a sealing washer at either end of the glass which is resiliently sealably pressed against the head and resiliently sealably pressed against the glass by a coil spring.

These and other objects of the invention will become apparent by reference to the following description of an integral body liquid level sight gauge embodying the invention taken in connection with the accompanying drawing in which:

Fig. 1 is a front elevational view of the device.

Fig. 2 is a cross-sectional view of the device taken on the line 2—2 of Fig. 1 with the tube shown partly in elevation; and Fig. 3 is an end elevational view of the device taken on the line 3—3 of Fig. 2.

Referring now to the drawing wherein like numerals refer to like and corresponding parts throughout the several views, the liquid level sight gauge disclosed therein to illustrate the invention includes a cast body 10 comprising like hollow heads 11 and 12, like spaced parallel struts 13 and 14 formed integral with the heads 11 and 12 joining them in secured spaced aligned relationship and like nipples 15 and 16 formed integral with the heads 11 and 12 respectively communicating with the hollow interiors thereof.

The like heads 11 and 12 are oppositely disposed and are equipped with facing and aligned sight tube receiving apertures 17 and 18 respectively and outwardly disposed threaded plug receiving apertures 19 and 20 respectively.

It can now be seen that the integral body 10 provides like chambers A and B in the heads 11 and 12 respectively, capable of communicating with the interior of a liquid container via the nipples 15 and 16 with the nipples being sealably disposed relative to the container 30 by sealing washers 31 and 32, nuts 33, and lock-washers 34. The tube 40 is disposed between the struts 13 and 14 in the apertures 17 and 18 so that the ends 41 and 42 of the tube 40 extend well into the chambers A and B respectively. It is to be noted that the heads 11 and 12 are equipped with shoulders 21 and 22 adjacent the apertures 17 and 18 respectively. Like sealing washers 43 and 44 are respectively disposed on the seats 21 and 22 and respectively surround the projecting ends 41 and 42 of the tube 40. Like coil springs 45 and 46 are respectively disposed in the chambers A and B of the heads 11 and 12 so as to surround the respective projecting ends 41 and 42 of the tube 40 and so that the springs 45 and 46 respectively bear upon the sealing washers 43 and 44. Like plugs 47 and 48 are sealably threaded in the threaded head apertures 19 and 20 respectively against the sealing washers 43 and 44 respectively. It can now be seen that the like springs 45 and 46 respectively press the sealing washers 43 and 44 against the shoulders 21 and 22 to effect a sealing relationship therebetween. It can also be seen that the pressure exerted by the like springs 45 and 46 against the washers 43 and 44 respectively causes them to expand sidewise outwardly and sidewise inwardly against the projecting ends 41 and 42 of the tube 40 in sealing relationship.

It is important to note that the plugs 47 and 48 do not contact the tube 40 and that the tube 40 floats in suspension between the sidewise expanded washers 43 and 44 free of any causes creating a tendency in the tube 40 to break. Due to the fact that the heads 11 and 12 are forming integral with the struts 13 and 14 the apertures 17 and 18 are fixed in secure alignment, so that no stress is placed on the tube 40. Moreover, in securing the device to a container 30, it is to be noted that the torque generated by tightening the nuts 33 is not transferred to the tube 40 but rather absorbed by the struts 13 and 14.

The device can be mounted either completely assembled or disassembled, as desired, to facilitate the individual and particular requirements of the job or the fancies of the applicator or workman. The sight tube 40 can be easily cleaned by removing the plugs 47 and 48 and projecting a bottle brush through the tube 40; washers 43 and 44 are easily replaced, as are the springs 45 and 46, if such is required. In the event higher pressures than normal are present in the container 30, heavier washers 43 and 44 and heavier springs 45 and 46 can be employed to exert greater sealing pressures against the shoulders 21 and 22 and against the projecting ends 41 and 42 of the tube 40. The inventive sight gauge with the features described constitutes a compact durable, fool-proof, and neat appearing article easily installed on a container and easily cleaned and serviced.

Although but a single embodiment of the invention has been shown and described in detail, it is obvious that many changes may be made in the size, shape, details, and arrangement of the various elements of the invention within the scope of the appended claims. For example, pet-cocks, not shown, may first be installed on the container and unions, not shown, may then be employed to mount the nipples 15 and 16 on the pet-cocks.

I claim:

1. A die-cast sight gauge having a single piece homogeneous body for visually determining the liquid level of a container such as a tank or boiler comprising a first hollow head, a second hollow head, a pair of spaced struts joining said heads, said heads each having a glass receiving first aperture in their near opposed ends located between said struts, a shoulder in each of said heads surrounding the first apertures, a glass tube disposed between said struts extending into said heads via the glass receiving apertures therein projecting beyond said shoulders, a washer in each of said heads positioned on said shoulder surrounding the projecting ends of said tube, a coil spring in each of said heads surrounding the projecting ends of said tube bearing on said washers; said heads each having second threaded apertures in their far opposite ends; a plug sealably threaded in each of said second apertures bearing against said springs so as to sealably press said washers against said shoulders and to sealably expand said washers against the sides of said tube projecting ends, and a nipple on the side of each of said heads communicating with the interior thereof and adapted to communicate with the interior of said container.

2. A gauge having a single piece homogeneous body for visually determining the liquid level of a container such as a tank or boiler comprising a first hollow head having a first glass tube receiving aperture in one end and a second threaded plug receiving aperture in the other end, a like second hollow head spaced from said first head having a first glass tube receiving aperture in one end and a second threaded plug receiving aperture in the other end; said heads being integrated with their tube receiving apertures inwardly disposed facing each other in alignment and their plug receiving apertures outwardly disposed; paired struts connecting said heads and joining with said heads on either side of the tube receiving apertures thereof; a first shoulder in said first head surrounding the tube aperture, a second shoulder in said second head surrounding the tube aperture, a sight tube disposed between said struts projecting into said heads beyond said shoulders, a first washer in said first head seated on said first shoulder surrounding the adjacent projecting end of said tube, a second washer in said second head seated on said second shoulder surrounding the adjacent projecting end of said tube, a first coil spring disposed in said first head surrounding the adjacent projecting end of said tube and bearing on said first washer, a second coil spring disposed in said second head surrounding the adjacent projecting end of said tube and bearing on said second washer, a first plug sealably threaded in the second aperture of said first head compressing said first spring on said first washer so as to sealably press said first washer on said first shoulder and to sealably expand said first washer against the adjacent projecting end of said tube, a second plug sealably threaded in the second aperture of said second head compressing said second spring on said second washer so as to sealably press said second washer on said second shoulder and to sealably expand said second washer against the adjacent projecting end of said tube, and means for connecting each of said heads to said container in communication with the interior of said container.

3. A sight gauge having a single piece homogeneous body comprising like spaced hollow top and bottom heads oppositely disposed, paired struts integrally joining said heads; each head having a tube receiving aperture located between said struts facing and aligned with each other, and a threaded plug receiving aperture outwardly disposed at the top and bottom of the body; and like nipples integral with said heads projecting sidewise outwardly from said heads in alignment communicating with the hollow interior of said heads and adapted to communicate with the interior of a container to connect the interior of said heads with the interior of a container; like shoulders in each said head surrounding the tube receiving apertures, a sight tube disposed between said heads lying between said struts and projecting inwardly of said heads past said shoulders, like washers in said heads seated on said shoulders surrounding the projecting ends of said tube, like coil springs in said heads surrounding the projecting ends of said tube bearing on said washers, and like plugs sealably threaded in the plug apertures of said heads sealably compressing said washers against said shoulders and sealably expanding said washers sidewise outwardly against the projecting ends of said tube.

4. A sight gauge having spaced, hollow top and bottom heads, each of said heads having means adapted to connect said heads to a container and to transmit fluid from the interior of said container into said heads, means connecting said heads and holding them in spaced relation, each head having a tube receiving aperture located therein facing each other and being aligned with each other, a threaded plug receiving aperture in each head oppositely disposed with respect to said tube receiving apertures, said plug receiving apertures terminating at a shoulder inside said hollow heads, a sealing washer disposed on each of said shoulders, and a spring contacting each of said washers, whereby plugs threaded into said plug receiving apertures compress said springs which expand said washers in a direction to restrict said tube receiving apertures.

References Cited in the file of this patent

UNITED STATES PATENTS

| 839,618 | Murphy | Dec. 25, 1906 |
| 2,130,981 | Fischer | Sept. 20, 1938 |

FOREIGN PATENTS

| 2,383 | Great Britain | June 7, 1876 |
| 4,322 | Great Britain | Feb. 17, 1897 |
| 7,567 | Great Britain | Mar. 29, 1902 |